United States Patent
Suzuki

(10) Patent No.: US 9,191,560 B2
(45) Date of Patent: Nov. 17, 2015

(54) IMAGE CAPTURING APPARATUS THAT PERFORMS PHOTOELECTRIC CONVERSION ON INCIDENT LIGHT THAT HAS PASSED THROUGH AN IMAGING LENS AND OUTPUTS AN ELECTRIC SIGNAL

(71) Applicant: CANON KABUSHIKI KAISHA, Tokyo (JP)

(72) Inventor: Satoshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/738,198

(22) Filed: Jan. 10, 2013

(65) Prior Publication Data

US 2013/0182170 A1 Jul. 18, 2013

(30) Foreign Application Priority Data

Jan. 13, 2012 (JP) .................................. 2012-005663

(51) Int. Cl.
H04N 5/335 (2011.01)
H04N 5/225 (2006.01)
H04N 5/361 (2011.01)

(52) U.S. Cl.
CPC ............. *H04N 5/2254* (2013.01); *H04N 5/361* (2013.01)

(58) Field of Classification Search
CPC ..................................................... H04N 1/195
USPC ................ 348/335, 340, 345, 348; 250/208.1
See application file for complete search history.

(56) References Cited

U.S. PATENT DOCUMENTS

2006/0262209 A1* 11/2006 Kishi ............................ 348/297
2006/0268358 A1* 11/2006 Okada .......................... 358/448

(Continued)

FOREIGN PATENT DOCUMENTS

| CN | 1874429 A | 12/2006 |
| CN | 102037717 A | 4/2011 |
| CN | 102090053 A | 6/2011 |

(Continued)

OTHER PUBLICATIONS

Ren Ng et al. "Light Field Photography with a Hand-Held Plenoptic Camera", (Stanford Tech Report CTSR Feb. 2005) 11 pages.

(Continued)

*Primary Examiner* — Joel Fosselman
(74) *Attorney, Agent, or Firm* — Cowan, Liebowitz & Latman, P.C.

(57) ABSTRACT

An image capturing apparatus comprises a photoelectric conversion unit that performs photoelectric conversion on incident light that has passed through an imaging lens and outputs an electric signal, the photoelectric conversion unit including a plurality of two-dimensionally arranged pixels, and a plurality of micro lenses formed between the imaging lens and the photoelectric conversion unit. The plurality of micro lenses respectively corresponds to a plurality of areas in the photoelectric conversion unit and each of the areas includes a predetermined number of pixels. Among the pixels, those whose receiving quantity of light is small in each area due to a characteristic of an optical system including the imaging lens and the micro lenses and a characteristic of the photoelectric conversion unit are configured as pixels for use in calculation of a reference value for the electric signals output from the photoelectric conversion unit.

9 Claims, 9 Drawing Sheets

(56) References Cited

U.S. PATENT DOCUMENTS

2010/0277629 A1* 11/2010 Tanaka .......................... 348/280
2011/0069189 A1* 3/2011 Venkataraman et al. .. 348/218.1

FOREIGN PATENT DOCUMENTS

| | | |
|---|---|---|
| CN | 102292974 A | 12/2011 |
| CN | 102318335 A | 1/2012 |
| KR | 10-2010-0119712 A | 11/2010 |

OTHER PUBLICATIONS

The above references were cited in a Mar. 26, 2015 Korean Office Action, which is enclosed without an English Translation, that issued in Korean Patent Application No. 10-2013-0001874.

The above references were cited in a Jul. 1, 2015 Chinese Office Action, a copy of which is enclosed with an English Translation, that issued in Chinese Patent Application No. 201310011240.7.

* cited by examiner

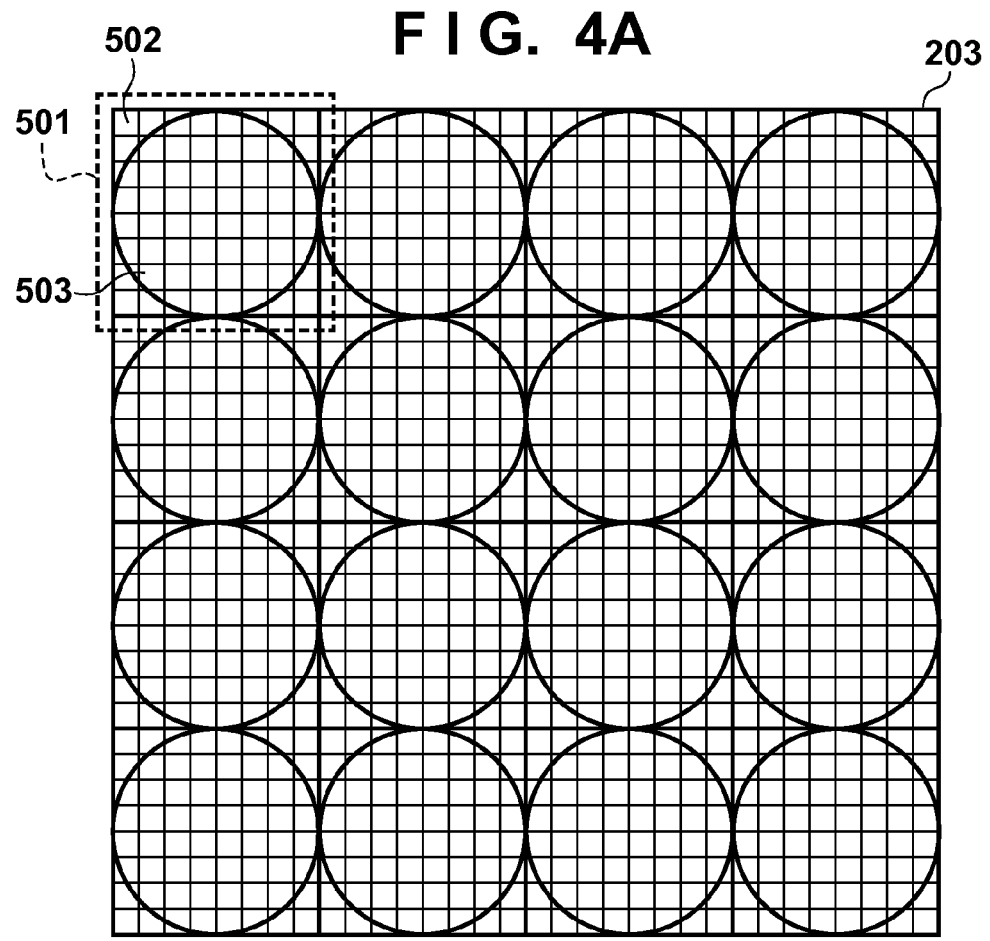

F I G. 7
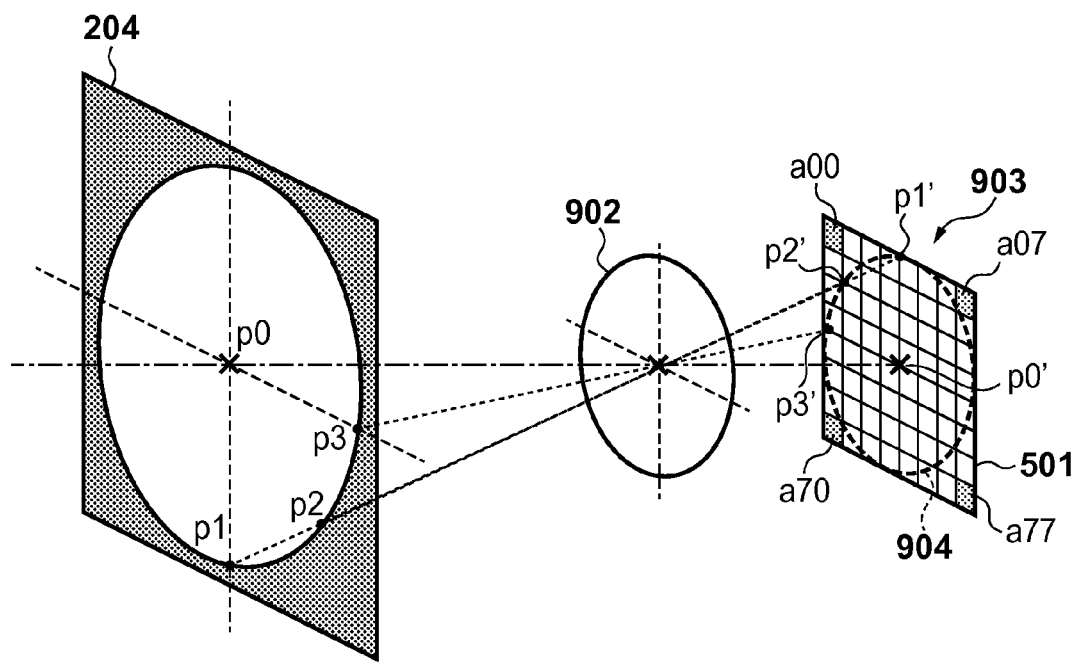

IMAGE CAPTURING APPARATUS THAT PERFORMS PHOTOELECTRIC CONVERSION ON INCIDENT LIGHT THAT HAS PASSED THROUGH AN IMAGING LENS AND OUTPUTS AN ELECTRIC SIGNAL

BACKGROUND OF THE INVENTION

1. Field of the Invention

The present invention relates to an image capturing apparatus that captures, records and reproduces still images and moving images, and more particularly to an image capturing apparatus that has a micro lens array in front of an image sensor, which is a constituent element of the image capturing apparatus.

2. Description of the Related Art

Conventionally, there are many image capturing apparatuses, such as electronic cameras, that record and reproduce still images and moving images captured with a solid-state image sensor such as a CCD or a CMOS by using a memory card having a solid-state memory element as a recording medium.

As an example of a technique for such image capturing apparatuses, an image capturing apparatus has been proposed that has a configuration in which a micro lens array where the lenses are arranged such that each corresponds to a plurality of pixels is arranged in front of a solid-state image sensor, whereby information regarding the incidence direction of light rays that are incident on the image sensor is also obtained (see, for example, Ren. Ng et al. "Light Field Photography with a Hand-Held Plenoptic Camera", Stanford Tech Report CTSR 2005-02).

Such an image capturing apparatus is capable of, in addition to generating ordinary captured images based on an output signal from each pixel, reconfiguring images focused at arbitrary distances by performing predetermined image processing on the captured images.

However, image capturing apparatuses, not only those having a micro lens array described above, have the following problems. Specifically, it is often the case that image sensors used in commonly-used image capturing apparatuses have an OB area that is used to determine a reference level of the output signal and that includes a plurality of optical black pixels (OB pixels) that are optically shielded from light. When the OB pixels are arranged within an effective pixel area that receives light from the subject, the light signal of the pixel area cannot be received, and therefore the OB pixels are often arranged in the periphery of the effective pixel area such as the upper side, the left side of the effective pixel area, and so forth, rather than within the effective pixel area.

However, no consideration has been given to the OB area in image capturing apparatuses having a micro lens array comprising micro lenses, each of which corresponds to a plurality of pixels, such as those described in the embodiments given in the present specification.

Also, if the reference level varies two-dimensionally within the capture surface, it is difficult to determine the reference level of the effective pixel area from the output signal from the OB area in the periphery, and as a result it may cause degradation of the obtained images.

SUMMARY OF THE INVENTION

The present invention has been made in consideration of the above situation, and provides an image capturing apparatus that includes a micro lens array comprising micro lenses, each of which corresponds to a plurality of pixels, and in which a detailed reference level in an effective pixel area can be acquired without adding a new constituent element.

According to the present invention, provided is an image capturing apparatus comprising: a photoelectric conversion unit that performs photoelectric conversion on incident light that has passed through an imaging lens and outputs an electric signal, the photoelectric conversion unit including a plurality of two-dimensionally arranged pixels; and a plurality of micro lenses that are formed between the imaging lens and the photoelectric conversion unit, the plurality of micro lenses respectively corresponding to a plurality of areas in the photoelectric conversion unit, each of the areas including a predetermined number of pixels, wherein among the pixels included in the plurality of areas, pixels whose receiving quantity of light is small in each area due to a characteristic of an optical system including the imaging lens and the micro lenses and a characteristic of the photoelectric conversion unit are configured as pixels for use in calculation of a reference value for the electric signals output from the photoelectric conversion unit.

According to the present invention, provided is an image capturing apparatus comprising: a photoelectric conversion unit that performs photoelectric conversion on incident light that has passed through an imaging lens and outputs an electric signal, the photoelectric conversion unit including a plurality of two-dimensionally arranged pixels; and a plurality of micro lenses that are formed between the imaging lens and the photoelectric conversion unit, the plurality of micro lenses respectively corresponding to a plurality of areas in the photoelectric conversion unit, each of the areas including a predetermined number of pixels, wherein among the pixels included in the plurality of areas, pixels that are arranged in an outermost region of each of the plurality of areas are configured as pixels for use in calculation of a reference value of an electric signal output from the photoelectric conversion unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B are diagrams showing a pixel arrangement in the image sensor according to the embodiment of the present invention;

FIG. 7 is a diagram two-dimensionally showing ray tracing in the image capturing apparatus according to the embodiment of the present invention;

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
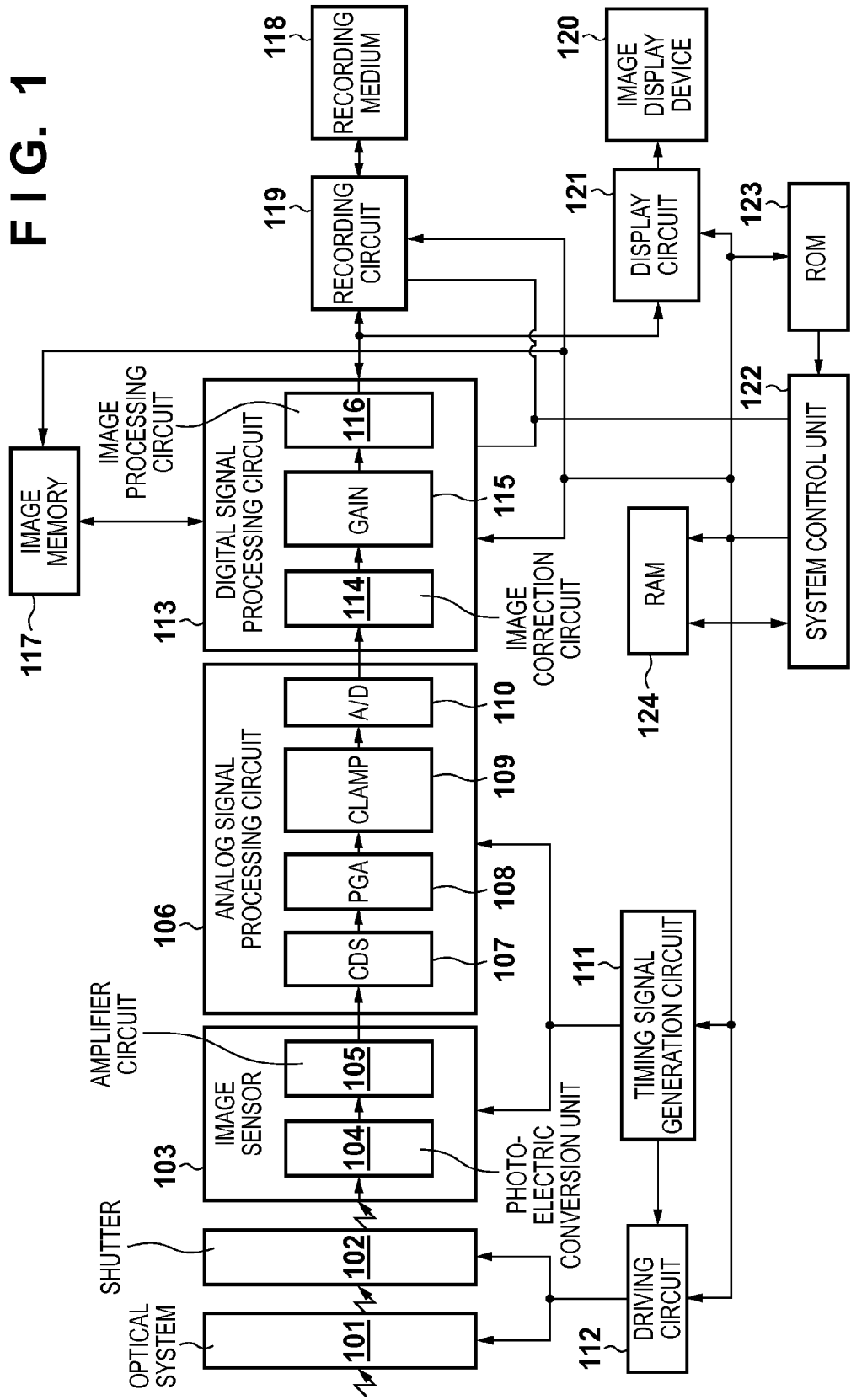
FIG. 1 is a block diagram showing a schematic configuration of an image capturing apparatus according to an embodiment of the present invention.

FIG. 1 is a block diagram showing a schematic configuration of an image capturing apparatus according to the present embodiment. In FIG. 1, reference numeral 101 denotes an optical system including an imaging lens, a diaphragm and a micro lens, and 102 is a mechanical shutter. An image sensor 103 converts incident light to an electric signal and includes a photoelectric conversion unit 104 that converts incident light to an electric signal and an amplifier circuit 105 that amplifies the electric signal. An analog signal processing circuit 106 performs analog signal processing on an image signal output from the image sensor 103. The analog signal processing circuit 106 includes a CDS circuit 107 that performs correlated double sampling, a signal amplifier 108 that amplifies an analog signal, a clamping circuit 109 that performs horizontal OB clamping, and an A/D converter 110 that converts an analog signal to a digital signal.

A timing signal generation circuit 111 generates a signal for operating the image sensor 103 and the analog signal processing circuit 106. A driving circuit 112 drives the optical system 101 and the mechanical shutter 102. A digital signal processing circuit 113 includes an image correction circuit 114 that performs necessary correction processing on image data, a signal amplifying circuit 115 that amplifies the digital signal that has been corrected by the image correction circuit 114, and an image processing circuit 116 that performs necessary image processing on image data. With these constituent elements, the digital signal processing circuit 113 performs necessary digital signal processing on the captured image data.

Reference numeral 117 is an image memory that stores the processed image data, 118 is a recording medium removable from the image capturing apparatus, and 119 is a recording circuit that records the image data that has undergone signal processing in the recording medium 118. Reference numeral 120 is an image display device that displays image data that has undergone signal processing, and 121 is a display circuit that displays an image on the image display device 120.

A system control unit 122 performs overall control on the image capturing apparatus. A non-volatile memory (ROM) 123 stores a program in which a control method executed by the system control unit 122 is written, control data, such as parameters and tables, for use in executing the program, and correction data such as defect addresses. The program, control data and correction data stored in the non-volatile memory 123, are transferred to and stored in a volatile memory (RAM) 124 which are used by the system control unit 122 when controlling the image capturing apparatus.

An image capturing operation of the image capturing apparatus having the above configuration will be described. Prior to the image capturing operation, at the start of the operation of the system control unit 122 such as when the image capturing apparatus is powered on, the necessary program, control data and correction data are transferred from the non-volatile memory 123 to the volatile memory 124 and stored. The program and data are used by the system control unit 122 when controlling the image capturing apparatus. Also, where necessary, additional programs and data are transferred from the non-volatile memory 123 to the volatile memory 124, or the system control unit 122 reads out data directly from the non-volatile memory 123 and uses the data.

First, in response to a control signal from the system control unit 122, the optical system 101 drives the optical system 101 such as a lens and forms on the image sensor 103 an image of the subject controlled so as to have an appropriate brightness. Next, in response to a control signal from the system control unit 122, the mechanical shutter 102 is driven such that the image sensor 103 is shielded from light along with the operation of the image sensor 103 so as to obtain the required exposure period when capturing a still image. At this time, in the case where the image sensor 103 has an electronic shutter function, the required exposure period may be secured by using electrical shutter function of the image sensor 103 together with the mechanical shutter 102. When capturing a moving image and when driven in live view, in response to a control signal from the system control unit 122, the mechanical shutter 102 is maintained in a full-open state such that the image sensor 103 is constantly exposed with light during image capturing.

The image sensor 103 is driven with a driving pulse based on an operation pulse generated by the timing signal generation circuit 111 that is controlled by the system control unit 122. The photoelectric conversion unit 104 converts the image of the subject into electric signals by using photoelectric conversion, and the amplifier circuit 105 multiplies an electric signal by a gain that is an amplification factor that has been set according to the quantity of incident light and outputs the product as an analog image signal.

In response to an operation pulse generated by the timing signal generation circuit 111 that is controlled by the system control unit 122, in the CDS circuit 107 of the analog signal processing circuit 106, clock synchronization noise is removed from the analog image signal output from the image sensor 103. Furthermore, the signal amplifier 108 multiplies the image signal by a gain that is an amplification factor that has been set according to the quantity of incident light, and the clamping circuit 109 clamps a signal output of a horizontal OB area as a reference voltage, and the signal is converted to a digital image signal by the A/D converter 110.

Next, in the digital signal processing circuit 113 that is controlled by the system control unit 122, processing is performed on the digital image signal output from the analog signal processing circuit 106. First, the image correction circuit 114 performs various types of image correction processing such as defect correction and dark shading correction on the image signal that has been converted to a digital signal. For correction to achieve a uniform dark level such as the dark shading correction, an output signal from a reference value calculation pixel (OB pixel) is used, which will be described later.

After that, the signal amplifying circuit 115 multiplies the signal by a gain that is an amplification factor that has been set according to the quantity of incident light, and the image processing circuit 116 performs various types of image processing including image processing such as color conversion, white balance and gamma correction, resolution conversion processing and image compression processing. Also, the image processing circuit 116 can perform, for example, re-focus processing by using the method disclosed by Ren. Ng et al. (processing for generating a plurality of images each focused at an arbitrary distance based on the electric signals output from the image sensor 103). At this time, the image memory 117 is used to temporarily store a digital image signal under signal processing or to store image data that is a digital image signal that has undergone signal processing.

The image data that has undergone signal processing in the digital signal processing circuit 113 and the image data stored in the image memory 117 are converted to data (for example, file system data having a hierarchical structure) suitable for the recording medium 118 by the recording circuit 119 and then recorded in the recording medium 118. Alternatively, the image data that has undergone resolution conversion processing in the digital signal processing circuit 113 is converted to a signal (for example, NTSC type analog signal or the like) suitable for the image display device 120 by the display circuit 121 and then displayed on the image display device 120, for example.

Here, in the digital signal processing circuit 113, in response to a control signal from the system control unit 122, the digital image signal may be output to the image memory 117 and the recording circuit 119 as image data, without performing signal processing. Also, if there is a request from the system control unit 122, the digital signal processing circuit 113 outputs a digital image signal generated during image processing and image data information to the system control unit 122. The image data information includes, for example, information regarding the spatial frequency of an image, the average value of a specific area, the amount of data of a compressed image and the like, or information extracted therefrom. Furthermore, if there is a request from the system control unit 122, the recording circuit 119 outputs information regarding the type, free space and the like of the recording medium 118 to the system control unit 122.

Next, a reproduction operation performed when image data is recorded in the recording medium 118 will be described. In response to a control signal from the system control unit 122, the recording circuit 119 reads out image data from the recording medium 118. Then, similarly, in response to a control signal from the system control unit 122, the digital signal processing circuit 113 performs image decompression processing on the read image data and stores the image data in the image memory 117 in the case where the read image data is a compressed image. Furthermore, the image data stored in the image memory 117 is subjected to resolution conversion processing by the digital signal processing circuit 113, thereafter converted to a signal suitable for the image display device 120 by the display circuit 121 and then displayed on the image display device 120.

Figure 2:
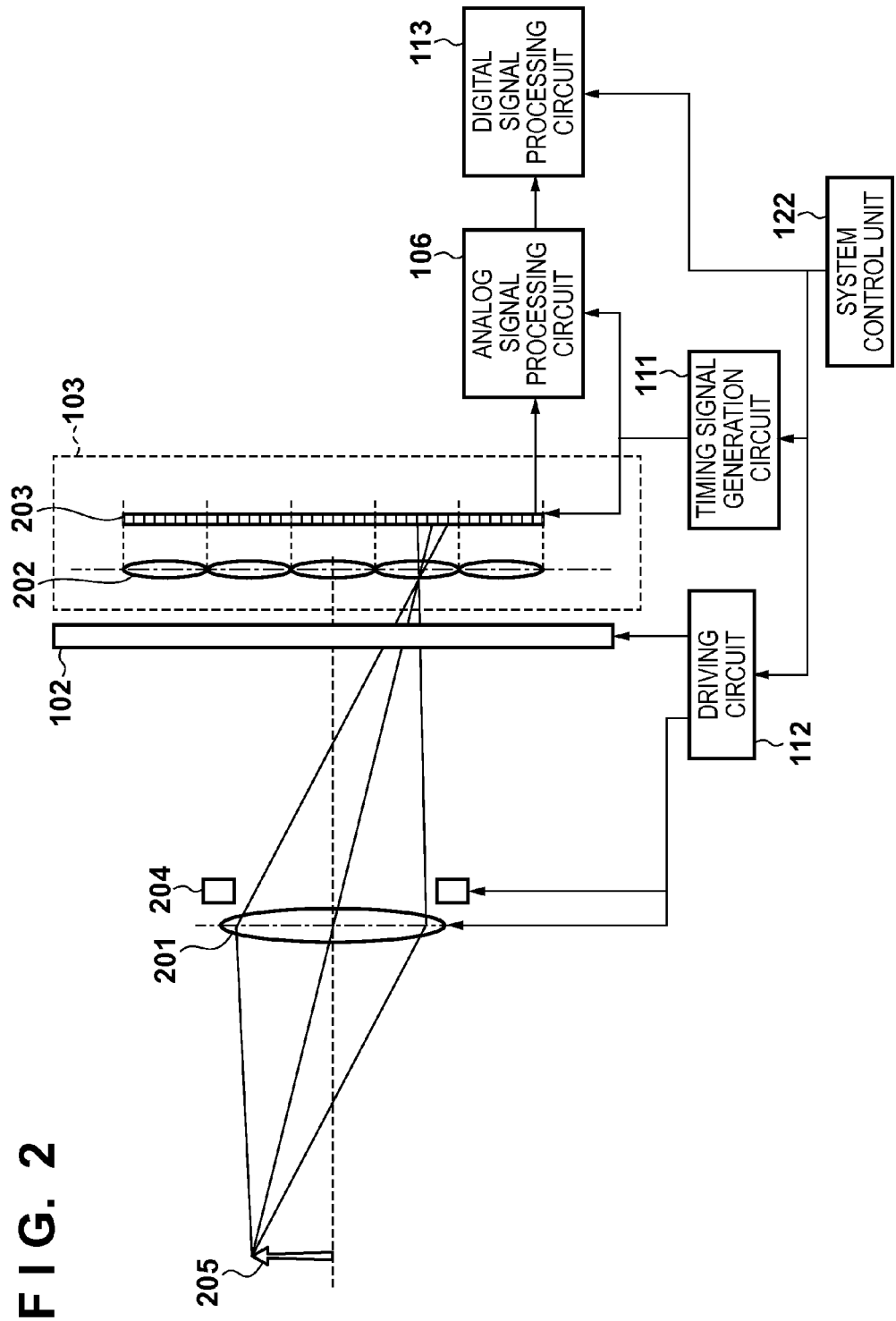
FIG. 2 is a block diagram showing constituent elements in the periphery of an optical system of the image capturing apparatus according to the embodiment of the present invention.

FIG. 2 is a block diagram illustrating constituent elements in the periphery of the optical system of the image capturing apparatus according to the embodiment of the present invention.

In FIG. 2, an imaging lens 201 and a diaphragm 204 together constitute the optical system 101. A micro lens array 202 and a sensor array 203 are constituent elements of the image sensor 103. Reference numeral 205 denotes a subject. The other constituent elements shown in FIG. 2 are the same as those described in connection with FIG. 1, and thus a description thereof is not given here.

In a state in which the mechanical shutter 102 and the diaphragm 204 are open by the driving circuit 112, an image of the subject 205 is formed on the image sensor 103 by the imaging lens 201. Light signals incident on the image sensor 103 are further converged by each micro lens of the micro lens array 202, and incident on each pixel of the sensor array 203.

The configurations of the micro lens array 202 and the sensor array 203 will be described later with reference to FIGS. 4A and 4B. The light signals incident on the sensor array 203 are subjected to photoelectric conversion in each pixel and output as electric signals. The processing after this is the same as that described with reference to FIG. 1.

Figure 3A:
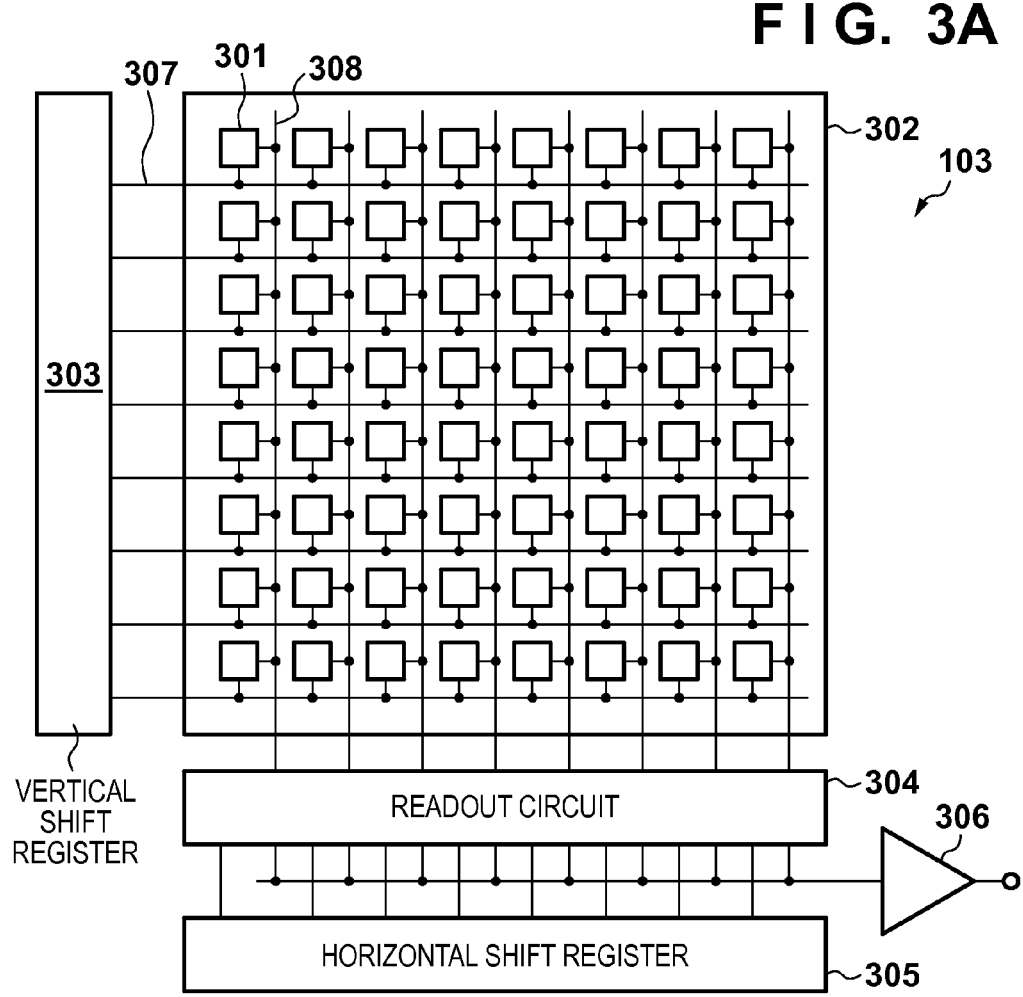
FIGS. 3A and 3B are diagrams showing a schematic configuration of an image sensor according to the embodiment of the present invention.
Figure 3B:
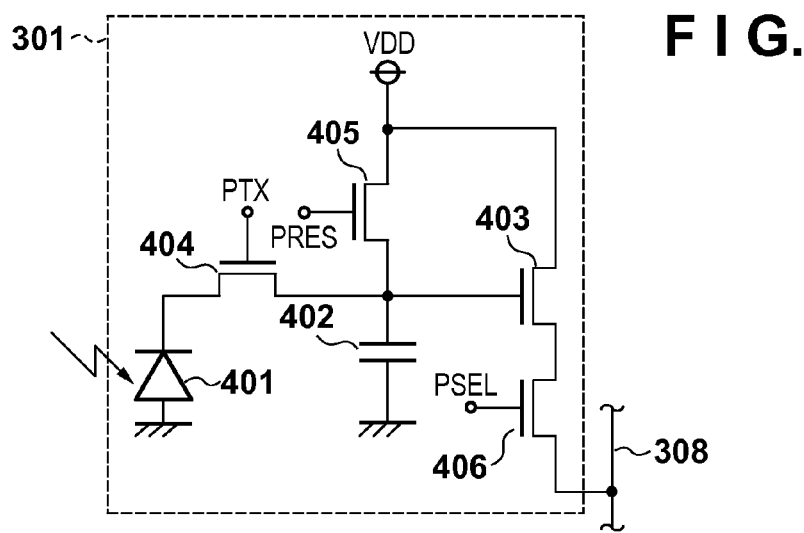

FIGS. 3A and 3B are diagrams showing a schematic configuration of the image sensor 103 of the image capturing apparatus of the present embodiment. As shown in FIG. 3A, the image sensor 103 includes a pixel area 302 in which a plurality of pixels 301 are arranged in an array and peripheral circuitry. The peripheral circuitry includes a vertical shift register 303, a readout circuit 304, a horizontal shift register 305, an output amplifier 306, driving signal lines 307, vertical signal lines 308, and so forth. A driving pulse is sent out from the vertical shift register 303 through a driving signal line 307 for each of the pixels arranged in each row. For simplification of the drawing, the driving signal lines 307 are illustrated such that a single driving signal line is provided for each row, but in fact, a plurality of driving signal lines are connected for each row. Also, the pixels aligned in the same column are connected to the same vertical signal line 308. The pixel signals of a row selected by the vertical shift register 303 are output to the readout circuit 304 through the vertical signal lines 308, and sequentially output from the pixel signals of a column selected by the horizontal shift register 305 through the output amplifier 306. FIGS. 3A and 3B show a configuration in which the pixel area 302 has pixels 301 in 8 columns and 8 rows, but in fact, the pixel area 302 is formed with pixels in several thousands of columns and rows.

FIG. 3B is a circuit diagram showing a configuration of a pixel 301 shown in FIG. 3A. As shown in FIG. 3B, the pixel 301 includes a photodiode 401, a floating diffusion unit 402, an amplifier unit 403, a transfer switch 404, a reset switch 405 and a selection switch 406.

The photodiode 401 functions as a photoelectric conversion unit that receives light that is incident on the pixel 301 and generates a signal charge according to the quantity of the received light. The floating diffusion unit 402 functions as a charge voltage conversion unit that temporarily stores the charge generated by the photodiode 401 and transferred, and converts the held charge to a voltage signal. The transfer switch 404 is driven with a transfer pulse signal PTX and transfers the signal charge generated by the photodiode 401 to the floating diffusion unit 402. The reset switch 405 is driven with a reset pulse signal PRES, and resets the potential of the floating diffusion unit 402 to a reference potential VDD. The amplifier unit 403 is a source follower MOS transistor, and amplifies the voltage signal based on the charge held by the floating diffusion unit 402 and outputs the signal as a pixel signal. The selection switch 406 is driven with a vertical selection pulse signal PSEL, and outputs the pixel signal amplified by the amplifier unit 403 to the vertical signal line 308.

FIGS. 4A and 4B are diagrams showing a relative arrangement between the pixels of the sensor array 203 and the micro lens array 202 constituting the image sensor 103 of the present embodiment. In FIG. 4A, reference numeral 501 denotes a recording pixel unit corresponding to a single pixel in a reconfigured image, and 502 denotes pixels arranged in 8 columns and 8 rows that constitute the recording pixel unit 501, each pixel provided for each photoelectric conversion unit and corresponding to the pixel 301 described with reference to FIGS. 3A and 3B. Reference numeral 503 denotes micro lenses arranged in one to one correspondence with the recording pixel units 501.

The present embodiment will be described using, as shown in FIGS. 4A and 4B, a sensor array 203 in which recording pixel units 501 are arranged in 4 columns and 4 rows, each recording pixel unit 501 including pixels 502 arranged in 8 columns and 8 rows. FIG. 4B is an enlarged diagram showing a recording pixel unit 501. In the following description of the present embodiment, as shown in FIG. 4B, 64 pixels are labeled with numbers from a00 to a77.

Figure 5:
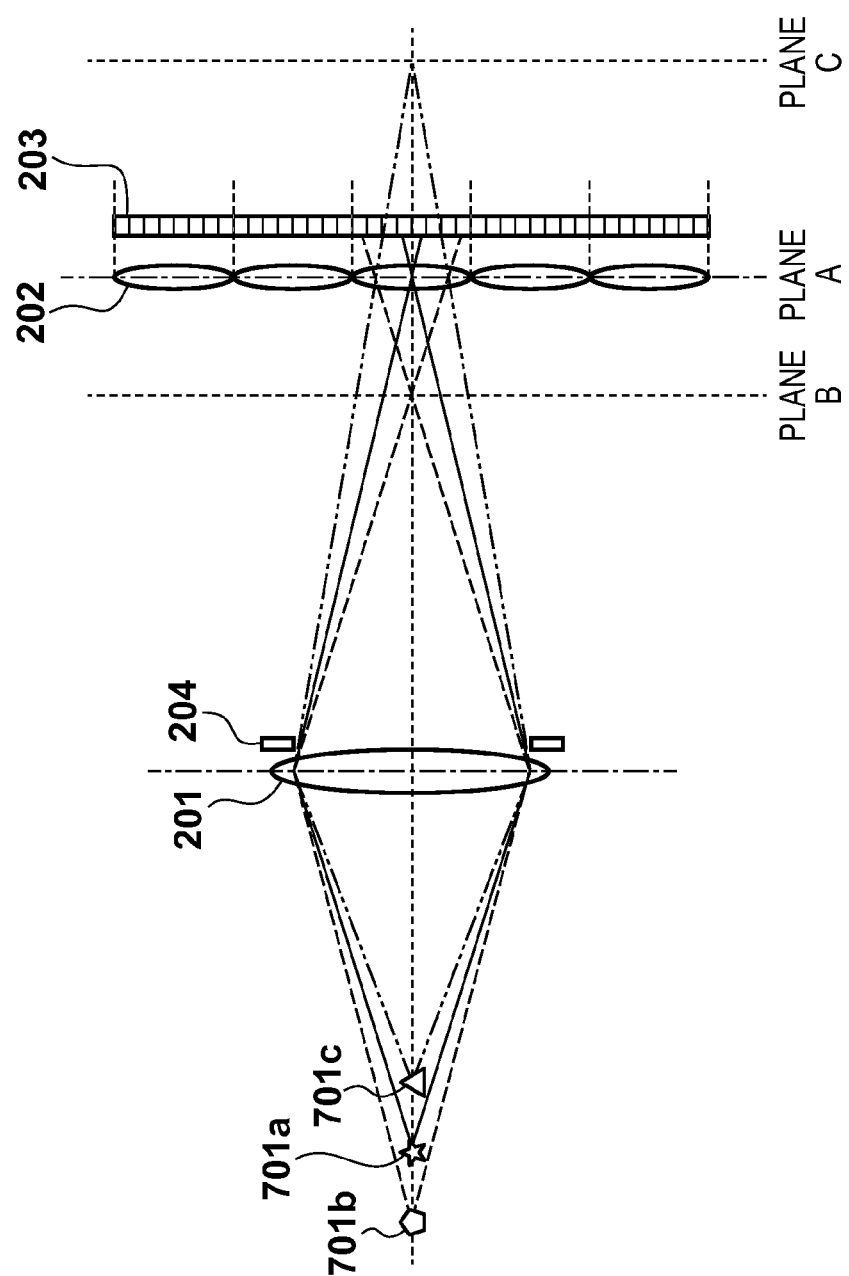
FIG. 5 is a ray tracing diagram from subjects in the image capturing apparatus according to the embodiment of the present invention.

FIG. 5 is a diagram showing ray tracing of light rays that are incident on the image capturing apparatus of the present embodiment from the subjects at various distances.

In FIG. 5, a subject 701a is the subject located at a position at which an image of the subject 701a is formed on a plane A including the micro lens array 202 by the imaging lens 201. Among the light rays from the subject 701a, those that pass through the outermost periphery of the imaging lens 201 and are incident on the sensor array 203 via the micro lens on the optical axis are indicated by solid lines.

A subject 701b is the subject located further away from the subject 701a as viewed from the imaging lens 201. An image of the subject 701b formed by the imaging lens 201 is formed on a plane B that is closer to the imaging lens 201 than the plane A including the micro lens array 202 is. Among the light rays from the subject 701b, those that pass through the outermost periphery of the imaging lens 201 and are incident on the sensor array 203 via the micro lens on the optical axis are indicated by broken lines.

A subject 701c is the subject located closer to the imaging lens 201 than the subject 701a is, as viewed from the imaging lens 201. An image of the subject 701c formed by the imaging lens 201 is formed on a plane C that is further away from the imaging lens 201 than the plane A including the micro lens array 202 is. Among the light rays from the subject 701c, those that pass through the outermost periphery of the imaging lens 201 and are incident on the sensor array 203 via the micro lens on the optical axis are indicated by dashed and two-dotted lines.

As indicated by the ray tracing of each light ray shown in FIG. 5, light is incident on different pixels of the sensor array 203 depending on the distance from the imaging lens 201 to the subject 701. Based on this fact, with the image capturing apparatus having the above configuration, image signals after image capturing are reconfigured, whereby images focused on the subjects at various distances can be generated.

Figure 6:
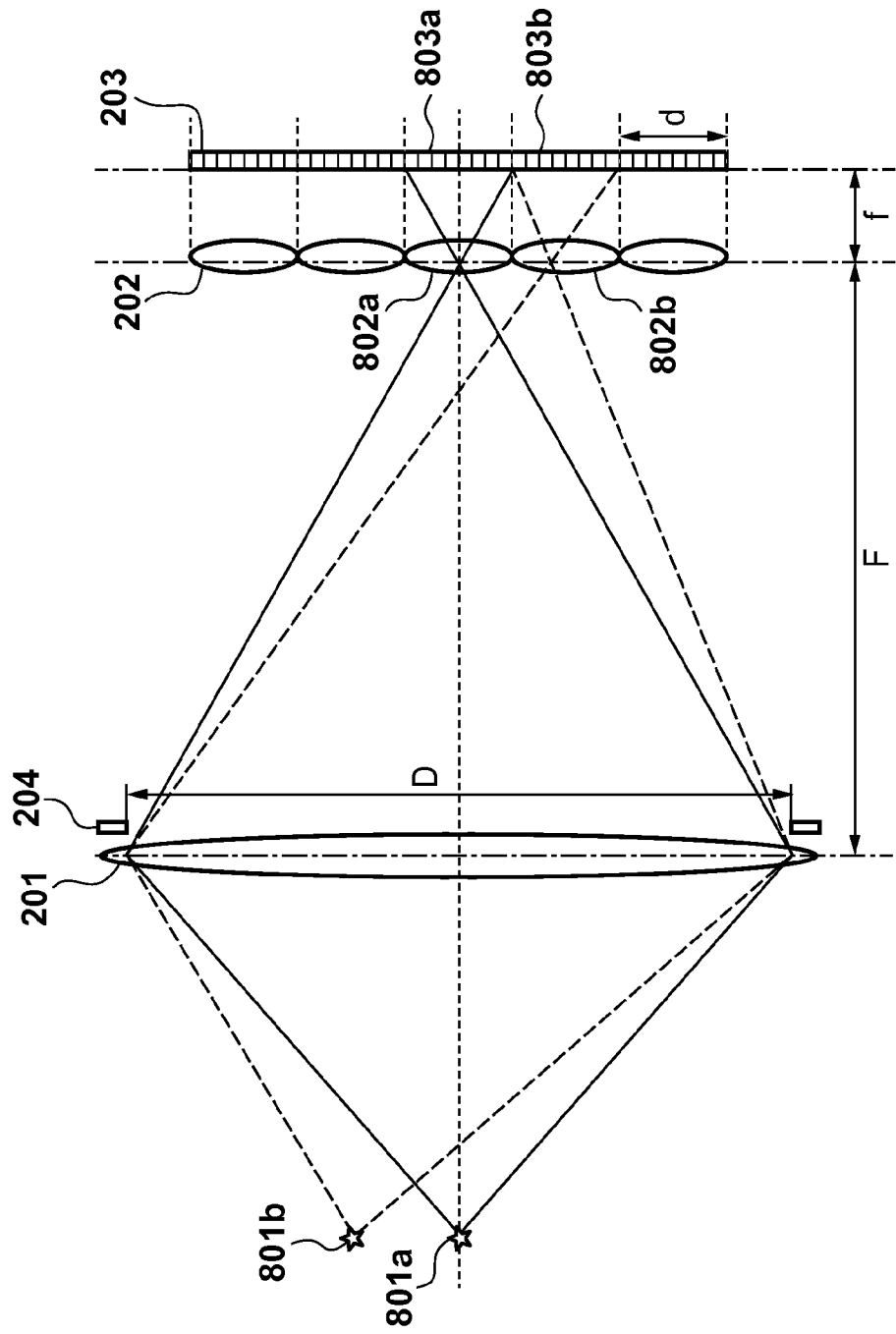
FIG. 6 is a ray tracing diagram from subjects at different positions in the image capturing apparatus according to the embodiment of the present invention.

FIG. 6 is a diagram showing ray tracing of light rays that are incident on the image capturing apparatus of the present embodiment from the subjects at different positions.

In FIG. 6, a subject 801a is the subject located at a position at which an image of the subject 801a is formed on a micro lens 802a on the plane A including the micro lens array 202 by the imaging lens 201. Among the light rays from the subject 801a those that pass through the outermost periphery of the imaging lens 201 and are incident on the sensor array 203 via the micro lens 802a are indicated by solid lines. These light rays arrive at a recording pixel unit 803a on the sensor array 203.

A subject 801b is the subject located at a position that is away from the imaging lens 201 at the same distance as the subject 801a, as viewed from the imaging lens 201, and at which an image of the subject 801b is formed on a micro lens 802b on the plane A including the micro lens array 202 by the imaging lens 201. Among the light rays from the subject 801b, those that pass through the outermost periphery of the imaging lens 201 and are incident on the sensor array 203 via the micro lens 802b are indicated by broken lines. These light rays arrive at a recording pixel unit 803b via the sensor array 203.

In the embodiment of the image capturing apparatus according to the present invention, in order to make the most effective use of the pixels of the sensor array 203, the micro lens array 202 is arranged such that the F number, which is one of the characteristics of a lens, matches between the imaging lens 201 and the micro lens. If it is assumed here that the opening diameter of the imaging lens 201 is denoted by D, the distance from the imaging lens 201 to the micro lens array 202 is denoted by F, the length of one side of the recording pixel unit 501 is denoted by d, and the distance from the micro lens array 202 to the sensor array 203 is denoted by f, then the following relationship holds:

$$D/F = d/f.$$

In the case of such an arrangement, among the light rays from the subject 801a, those that pass through the outermost periphery of the imaging lens 201 and are incident on the recording pixel unit 803a of the sensor array 203 via the micro lens 802a arrive at a position in a distance of d/2 from the center of the recording pixel unit 803a as indicated by the solid lines in FIG. 6. Likewise, among the light rays from the subject 801b, those that pass through the outermost periphery of the imaging lens 201 and are incident on the recording pixel unit 803b of the sensor array 203 via the micro lens 802b arrive at a position in a distance of d/2 from the center of the recording pixel unit 803b as indicated by the broken lines in FIG. 6. At this time, any of the light rays does not arrive at a position away from the recording pixel unit corresponding to each micro lens, and therefore a situation can be prevented in which reconfiguration (refocusing) of the image is not possible due to the overlapping of light signals on the sensor array.

FIG. 7 is a diagram two-dimensionally showing ray tracing of incident light rays in the image capturing apparatus according to the present embodiment. In FIG. 7, reference numeral 902 denotes one of the micro lenses of the micro lens array 202, and 903 denotes the sensor array surface.

A light ray passing through a center p0 of the diaphragm 204 is incident on a point p0' at which the sensor array surface 903 and the optical axis intersect. A light ray from the subject located at a position at which an image of the subject is formed on a plane including the micro lens array 202 by the imaging lens 201 that passes through a point p1 on the outer periphery of the aperture of the diaphragm 204 is incident on p1' on the sensor array surface 903. Likewise, light rays passing through other points p2 and p3 on the outer periphery of the aperture of the diaphragm 204 are respectively incident on points p2' and p3' on the sensor array surface 903.

As described above, theoretically, among light rays from the subject located at a position at which an image of the subject is formed on a plane including the micro lens array 202 by the imaging lens 201, all of those passing through the diaphragm 204 and the micro lens 902 are incident on the inside of a circle 904 on the sensor array surface 903 and do not arrive at the outside of the circle 904. Accordingly, no light rays, excluding a small quantity of stray light and ghost light, arrive at pixels a00, a07, a70 and a77 on the sensor array surface 903.

The same is true for light rays from the subject located at a position other than the position at which an image of the subject is formed on a plane including the micro lens array 202 by the imaging lens 201. In other words, the quantity of light rays that are received by the pixels a00, a07, a70 and a77 on the sensor array surface 903 and are effective in the generation of a refocused image is smaller than that of the pixels around the optical axis of the micro lens, and thus there is a small influence on the subsequent re-focus processing.

Specifically, the pixels a00, a07, a70 and a77 located at four corners of the recording pixel unit 501 have a relatively small quantity of received light due to the characteristics (i.e., D, F, d, f and the like described above) of the image sensor 103 and the optical system including the imaging lens 201 and the micro lens array 202. Accordingly, it can be said that these pixels are ineffective for re-focus processing.

Figure 8:
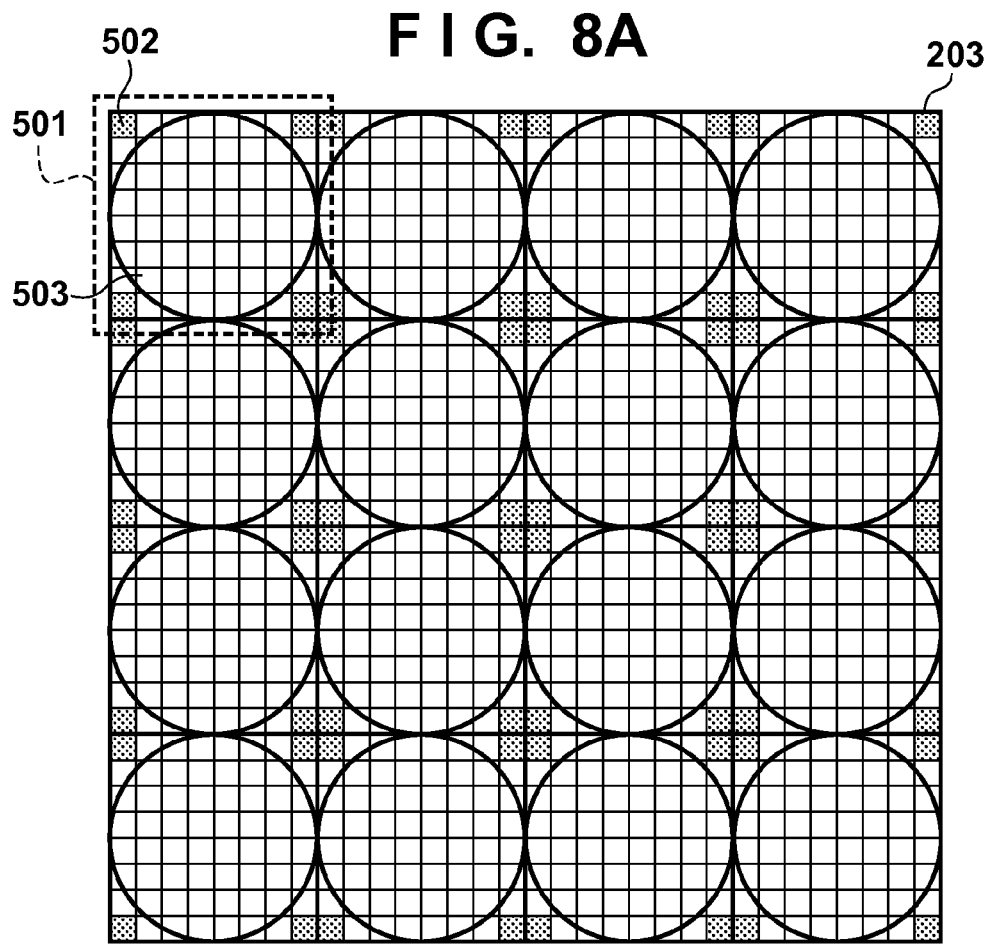
FIGS. 8A and 8B are diagrams illustrating a pixel arrangement in the image sensor according to the embodiment of the present invention.

FIGS. 8A and 8B are diagrams showing a pixel arrangement in the image capturing apparatus of the present embodiment. FIG. 8A is a layout diagram in the sensor array 203 described with reference to FIG. 4A, and FIG. 8B is an arrangement diagram of a recording pixel unit 501 and pixels 502, which are constituent elements of the sensor array 203 described with reference to FIG. 4B.

In FIG. 8B, the pixels a00, a07, a70 and a77 located at four corners of the recording pixel unit 501 are, as described with reference to FIG. 7, pixels that are arranged in an area that is not suitable for re-focus processing, which is performed in a later stage, and therefore these pixels are used as OB pixels. In FIGS. 8A and 8B, the pixels that are used as OB pixels are shaded in gray and the pixels that are used as effective pixels are shown in white. The four pixels that are used as OB pixels are shielded from light with aluminum wiring in order to enhance the light blocking effect.

Figure 9:
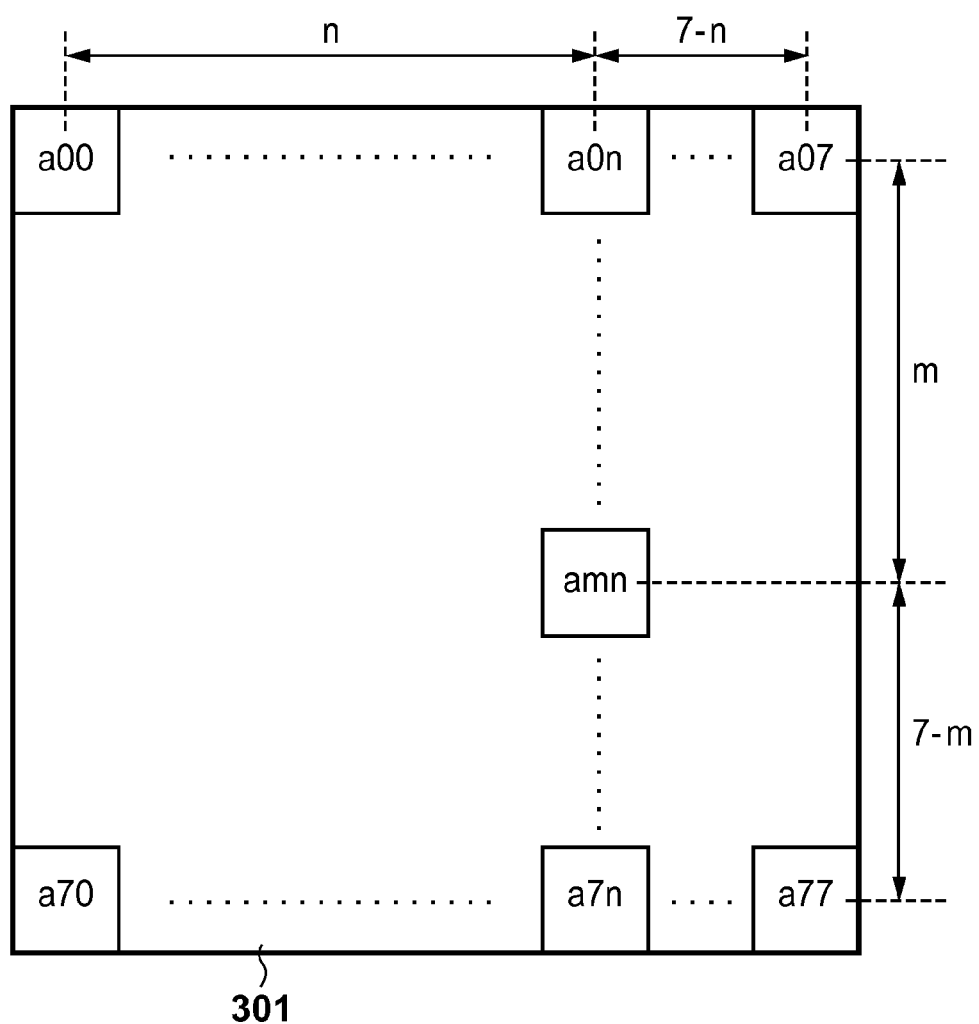
FIG. 9 is a diagram illustrating an example of a reference level calculation method according to the embodiment of the present invention.

FIG. 9 is a diagram illustrating an example of a reference level calculation method in the image capturing apparatus of the present embodiment. The method for calculating a reference level of a pixel amn by using output signal values of the OB pixels a00, a07, a70 and a77 in the pixel arrangement shown in FIG. 8B will be described with reference to FIG. 9.

This calculation method is a method in which calculation is performed assuming that the reference levels of the OB pixels transition linearly in proportion to the distance from the OB pixel. The output signal values of the OB pixels a00, a07, a70 and a77 are respectively expressed as B(0, 0), B(0, 7), B(7, 0) and B(7, 7). A pixel a0n is the pixel located at the position at which the distance between the OB pixel a00 and the OB pixel a07 is internally divided in n:7-n. Accordingly, the reference level B(0, n) of the pixel a0n is represented as follows:

$$B(0,n) = (1-n/7) \cdot B(0,0) + n/7 \cdot B(0,7).$$

Similarly, a pixel a7n is the pixel located at the position at which the distance between the OB pixel a70 and the OB pixel a77 is internally divided in n:7−n, and therefore the reference level B(7, n) of the pixel a7n is represented as follows:

$$B(7,n) = (1-n/7) \cdot B(7,0) + n/7 \cdot B(7,7).$$

The same calculation applies to the vertical direction. The pixel amn is the pixel located at a position at which the distance between the OB pixel a0n and the OB pixel a7n is internally divided in m:7−m, and therefore the reference level B(m, n) of the pixel amn is represented as follows:

$$B(m, n) = (1 - m/7) \cdot (1 - n/7) \cdot B(0, 0) + (1 - m/7) \cdot n/7 \cdot B(0, 7) +$$
$$m/7 \cdot (1 - n/7) \cdot B(7, 0) + m/7 \cdot n/7 \cdot B(7, 7).$$

As described above, with the image capturing apparatus of the present embodiment, by arranging OB pixels within an effective pixel area, it is possible to acquire reference levels that are finer and more accurate than the conventional technology. Accordingly, by performing dark level correction or the like by using such reference levels, it is possible to achieve an image capturing apparatus that can provide images of good image quality.

The foregoing has described the embodiment of the image capturing apparatus according to the present invention with reference to FIGS. 1 to 9, but the present invention is not limited thereto, and the present invention can take various forms.

For example, in the pixel configuration of the embodiment of the image capturing apparatus according to the present invention, in order to facilitate the understanding of the pixel structure, a single recording pixel unit is configured with 8-by-8 pixels. However, the present invention is not limited thereto, and a single recording pixel unit may be configured with any number of pixels with any shape.

Also, in the pixel configuration of the embodiment of the image capturing apparatus according to the present invention, the pixels that are located at specific positions of the outermost region and whose receiving quantity of light rays, passed through the diaphragm 204 and the micro lens 902, that can be used in re-focus processing later are used as OB pixels. However, the present invention is not limited thereto, and more pixels may be used as OB pixels such as using a configuration in which the pixels whose receiving quantity of light rays that can be used for re-focus processing and the pixels surrounding such pixels are used OB pixels. In this case, it is desirable that the pixels used as OB pixels are shield from light with aluminum such that light rays do not arrive at the pixels.

The pixel configuration of the embodiment of the image capturing apparatus according to the present invention was described taking an example in which the OB pixels are shielded from light with aluminum wiring, but the present invention is not limited thereto. The OB pixels may be shielded from light by any other methods. For example, a configuration may be possible in which a black color filter is disposed in front of the OB pixels so as to produce the light blocking effect.

Alternatively, in the case of using the OB pixels of the present invention for shading correction of a circuit system, for example, instead of using the light blocking member as described above, it is possible to use a configuration in which the charges generated in the photoelectric conversion units are not transferred or a configuration that does not include the photoelectric conversion units.

To describe it more specifically, the pixels that are used as OB pixels may be configured such that by causing the transfer switch 404 shown in FIG. 3B to be constantly open, the signal charge generated by the photodiode 401 is not transferred. It is also possible to use a configuration in which the photodiode 401 and the transfer switch 404 are not provided and a reset level corresponding to the reference potential VDD is constantly read out.

Also, the method for calculating a reference level for each pixel was described with reference to FIG. 9 taking an example in which a reference value of each pixel is calculated based on the distance from four OB pixels. However, the present invention is not limited thereto. For example, it is possible to use a configuration in which with respect to the OB pixels 502 belonging to a recording pixel unit 501, the average value of the output values of four OB pixels belonging to the recording pixel unit 501 is set uniformly as the reference level of the pixels of the recording pixel unit 501. With this configuration, the amount of computation can be reduced.

Also, in the embodiment of the present invention described with reference to FIG. 1, the digital signal processing circuit 113, which is a constituent element of the image capturing apparatus, performs image processing such as image reconfiguration, but the image processing is not necessarily performed inside the image capturing apparatus. Specifically, it is possible to use a configuration in which an image processing unit is provided in an apparatus separate from the image capturing apparatus such as a PC (personal computer), captured data obtained by the image capturing apparatus is transferred to the PC, and image processing is performed in the PC.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-005663, filed on Jan. 13, 2012 which is hereby incorporated by reference herein in its entirety.

What is claimed is:

1. An image capturing apparatus comprising:
a photoelectric conversion unit that performs photoelectric conversion on incident light that has passed through an imaging lens and outputs an electric signal, the photoelectric conversion unit including a plurality of two-dimensionally arranged pixels;
a plurality of micro lenses that are formed between the imaging lens and the photoelectric conversion unit, the plurality of micro lenses respectively corresponding to a plurality of areas in the photoelectric conversion unit, each of the areas including a predetermined number of pixels, wherein the pixels included in each of the plurality of areas include effective pixels on which a relatively large quantity of light is incident for generating an image signal, and pixels on which a relatively small quantity of light is incident due to a characteristic of an optical system including the imaging lens and the micro lenses and a characteristic of the photoelectric conversion unit,
a reference value calculation unit that calculates for each of the plurality of areas a reference value for processing the image signal output from the effective pixels in the same area for which the reference value is calculated using an electric signal of the pixels on which a relatively small quantity of light is incident in the area,
wherein the pixels on which a relatively small quantity of light is incident are shielded from light, have a configuration in which the electric signal generated by photoelectric conversion is not output, or do not have a configuration that performs photoelectric conversion.

2. The image capturing apparatus according to claim 1, wherein the pixels for use in calculation of the reference value are arranged in an outermost region of each of the plurality of areas.

3. The image capturing apparatus according to claim 1, further comprising a refocused image generation unit that performs re-focus processing for generating an image focused at an arbitrary distance based on the electric signal output from the photoelectric conversion unit.

4. The image capturing apparatus according to claim 1, wherein the characteristic of the optical system is F number of the micro lens, and the F number matches between the imaging lens and the micro lens.

5. An image capturing apparatus comprising:
a photoelectric conversion unit that performs photoelectric conversion on incident light that has passed through an imaging lens and outputs an electric signal, the photoelectric conversion unit including a plurality of two-dimensionally arranged pixels;
a plurality of micro lenses that are formed between the imaging lens and the photoelectric conversion unit, the plurality of micro lenses respectively corresponding to a plurality of areas in the photoelectric conversion unit, each of the areas including a predetermined number of pixels, and wherein the pixels included in each of the plurality of areas include pixels that are arranged in an outermost region of each of the plurality of areas and effective pixels that are arranged in a region except for the outermost region of each of the plurality of areas for generating of the image signal; and
a reference value calculation unit that calculates for each of the plurality of areas a reference value for processing the image signal output from the effective pixels in the same area for which the reference value is calculated using an electric signal of the pixels that are arranged in the outermost region in the area,
and wherein the pixels that are arranged in the outermost region are shielded from light, have a configuration in which the electric signal generated by photoelectric conversion is not output, or do not have a configuration that performs photoelectric conversion.

6. An image capturing apparatus comprising:
a photoelectric conversion unit that performs photoelectric conversion on incident light that has passed through an imaging lens and outputs an electric signal, the photoelectric conversion unit including a plurality of two-dimensionally arranged pixels; and
a plurality of micro lenses that are formed between the imaging lens and the photoelectric conversion unit, the plurality of micro lenses respectively corresponding to a plurality of areas in the photoelectric conversion unit, each of the areas including a predetermined number of pixels,
wherein among the pixels included in the plurality of areas, pixels on which a relatively large quantity of light is incident are configured as effective pixels for generating an image signal, and pixels on which a relatively small quantity of light is incident due to a characteristic of an optical system including the imaging lens and the micro lenses and a characteristic of the photoelectric conversion unit are configured as pixels for use in calculation of a reference value for the image signals output from the effective pixels of the photoelectric conversion unit,
and wherein the pixels on which a relatively small quantity of light is incident are shielded from light, have a configuration in which the electric signal generated by photoelectric conversion is not output, or do not have a configuration that performs photoelectric conversion, and
wherein an F number of each of the micro lenses is equal to an F number of the imaging lens.

7. The image capturing apparatus according to claim 6, wherein the pixels for use in calculation of the reference value are arranged in an outermost region of each of the plurality of areas.

8. The image capturing apparatus according to claim 6, further comprising a refocused image generation unit that performs re-focus processing for generating an image focused at an arbitrary distance based on the electric signal output from the photoelectric conversion unit.

9. An image capturing apparatus comprising:
a photoelectric conversion unit that performs photoelectric conversion on incident light that has passed through an imaging lens and outputs an electric signal, the photoelectric conversion unit including a plurality of two-dimensionally arranged pixels; and
a plurality of micro lenses that are formed between the imaging lens and the photoelectric conversion unit, the plurality of micro lenses respectively corresponding to a plurality of areas in the photoelectric conversion unit, each of the areas including a predetermined number of pixels, wherein among the pixels included in the plurality of areas, pixels that are arranged in an outermost region of each of the plurality of areas are configured as pixels for use in calculation of a reference value of an image signal output from effective pixels of the photoelectric conversion unit, and pixels that are arranged in a region except for the outermost region of each of the plurality of areas are configured as the effective pixels for generating of the image signal, and wherein the pixels on which a relatively small quantity of light is incident are shielded from light, have a configuration in which the electric signal generated by photoelectric conversion is not output, or do not have a configuration that performs photoelectric conversion, and wherein an F number of each of the micro lenses is equal to an F number of the imaging lens.

\* \* \* \* \*